(12) United States Patent
Beal

(10) Patent No.: US 9,820,479 B2
(45) Date of Patent: *Nov. 21, 2017

(54) TURKEY DECOY

(71) Applicant: Mitchell W. Beal, Beals, ME (US)

(72) Inventor: Mitchell W. Beal, Beals, ME (US)

(*) Notice: Subject to any disclaimer, the term of this patent is extended or adjusted under 35 U.S.C. 154(b) by 0 days.

This patent is subject to a terminal disclaimer.

(21) Appl. No.: 14/557,511

(22) Filed: Dec. 2, 2014

(65) Prior Publication Data

US 2016/0295852 A1 Oct. 13, 2016

Related U.S. Application Data

(62) Division of application No. 13/465,101, filed on May 7, 2012, now Pat. No. 8,925,240.

(51) Int. Cl.
*A01M 31/06* (2006.01)

(52) U.S. Cl.
CPC .................. *A01M 31/06* (2013.01)

(58) Field of Classification Search
CPC .................................................. A01M 31/06
See application file for complete search history.

(56) References Cited

U.S. PATENT DOCUMENTS

| | | | | |
|---|---|---|---|---|
| 4,965,953 A * | 10/1990 | McKinney | ............ | A01M 31/06 43/2 |
| 5,274,942 A * | 1/1994 | Lanius | .................. | A01M 31/06 43/2 |
| 5,459,958 A * | 10/1995 | Reinke | .................. | A01M 31/06 43/2 |
| 6,092,322 A * | 7/2000 | Samaras | ............... | A01M 31/06 43/2 |
| 6,708,440 B2 | 3/2004 | Summers et al. | | |
| 6,775,943 B2 * | 8/2004 | Loughman | ............ | A01M 31/06 43/2 |
| 7,231,737 B2 * | 6/2007 | Bradford | ............... | A01M 31/06 43/2 |
| 7,287,352 B1 | 10/2007 | Kirby | | |
| 7,562,487 B2 * | 7/2009 | Barr | ...................... | A01M 31/06 43/2 |
| 7,627,977 B2 * | 12/2009 | Denny | .................. | A01M 31/06 43/2 |
| 8,769,860 B2 * | 7/2014 | Bain | ..................... | A01M 31/06 43/2 |
| 8,925,240 B2 * | 1/2015 | Beal | ...................... | A01M 31/06 43/2 |
| 2004/0194365 A1 * | 10/2004 | Summers | ............... | A01M 31/06 43/2 |
| 2005/0204604 A1 * | 9/2005 | Noles | .................... | A01M 31/06 43/2 |
| 2010/0115818 A1 * | 5/2010 | Rogers | .................. | A01M 31/06 43/2 |
| 2011/0232153 A1 * | 9/2011 | Jennings, Jr. | ......... | A01M 31/06 43/2 |

* cited by examiner

*Primary Examiner* — Christopher P Ellis
(74) *Attorney, Agent, or Firm* — Anthony D. Pellegrini

(57) ABSTRACT

A "full body" turkey decoy having one or more of a movable head and a movable neck is controlled remotely by the operator to produce a life-like animation of the decoy. The movable head bobs to the ground and the movable neck arches and straightens, simulating realistic activity. The movable components of the decoy are controlled remotely by means of one or more pull cords, with movement of the components achieved by the use of springs and counterweights.

7 Claims, 7 Drawing Sheets

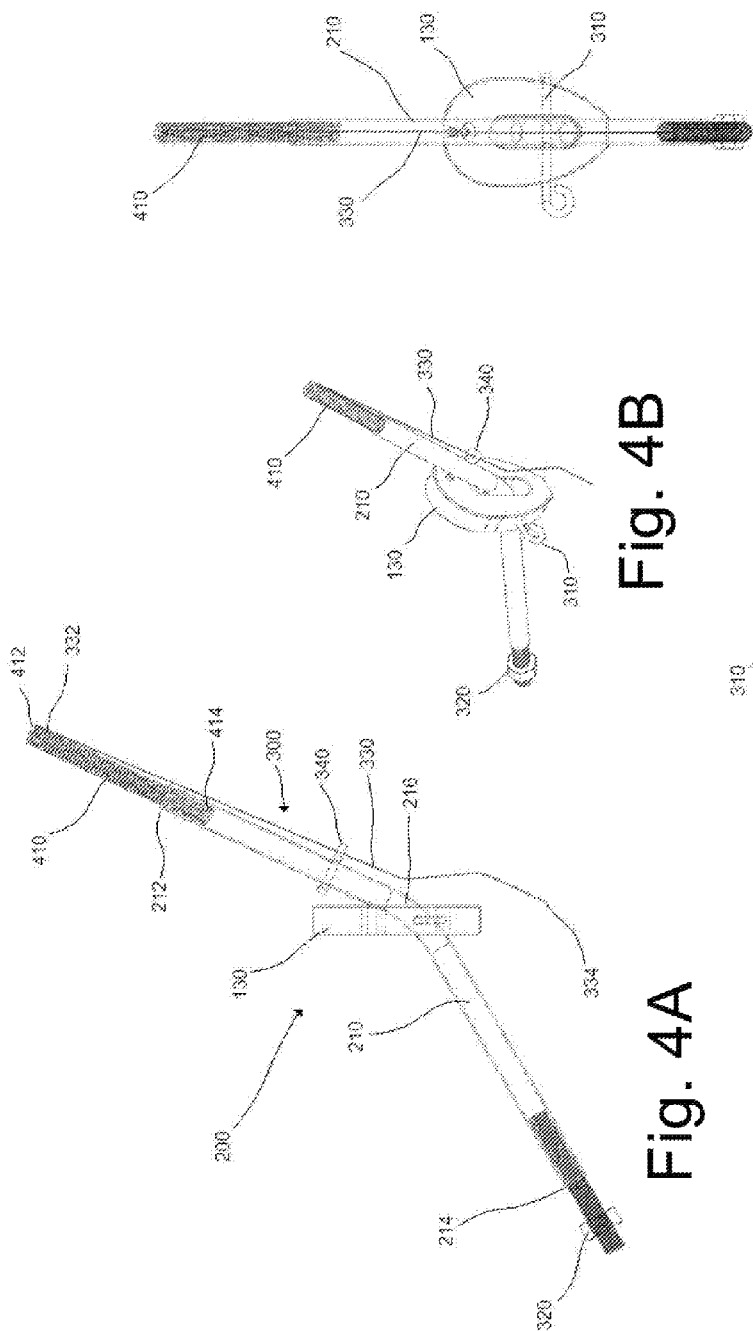
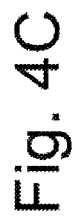
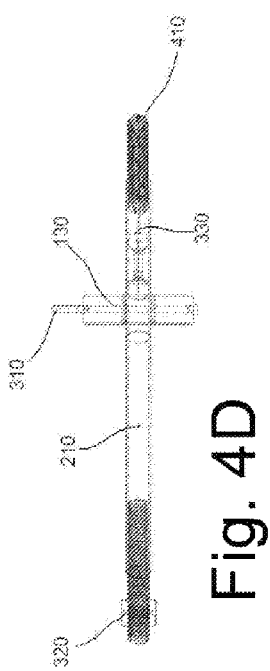

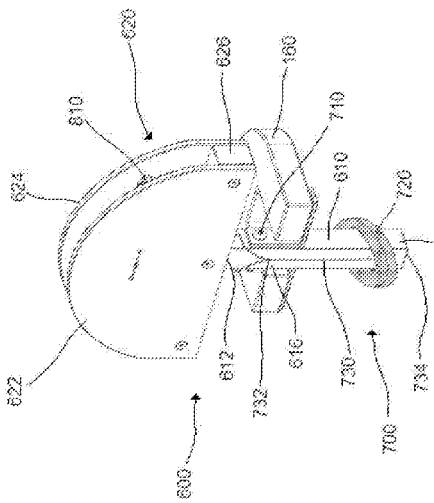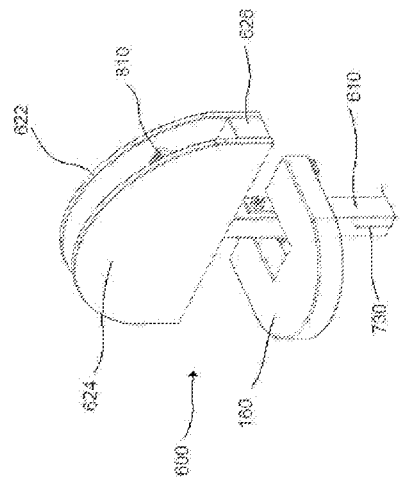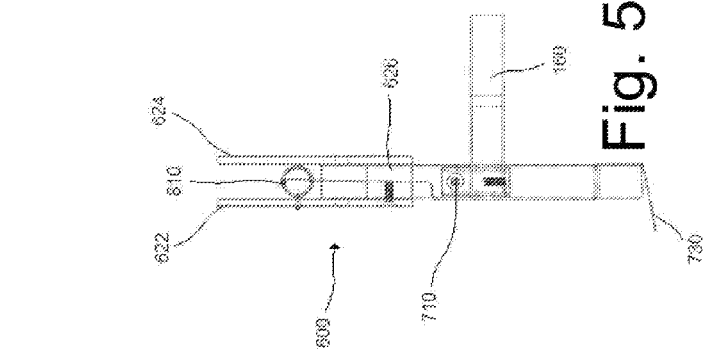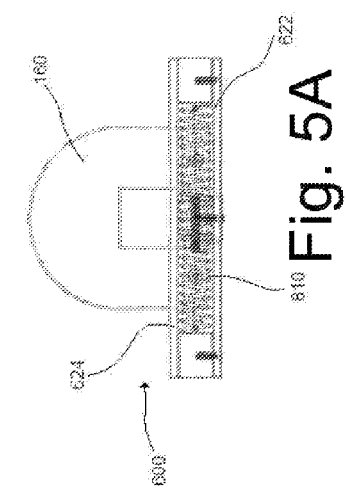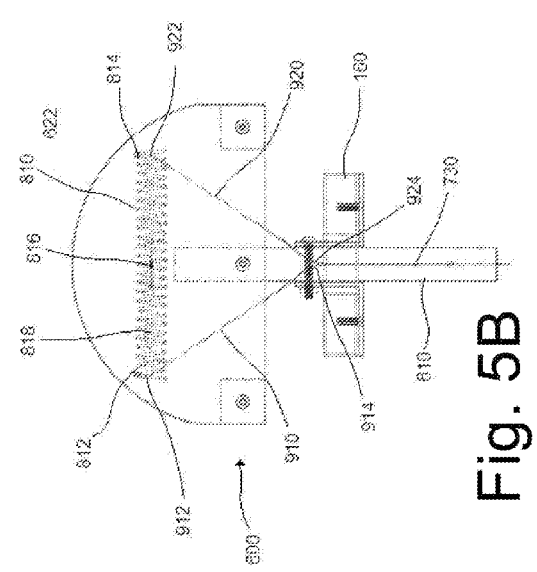

TURKEY DECOY

CROSS REFERENCE TO RELATED APPLICATION

This application is a divisional of U.S. Ser. No. 13/465,101, filed May 7, 2012 and currently pending, entitled Turkey Decoy, by Mitchell W. Beal, which is hereby incorporated by reference.

BACKGROUND OF THE INVENTION

Technical Field

The present invention relates generally to the field of game decoys. More particularly, the present invention is directed to turkey decoys having movement to simulate live wild turkeys.

Description of Prior Art

Turkey decoys are well known in the art. They are used primarily by hunters to attract wild turkeys, though bird watchers also use them. They range from simple, two dimensional cardboard cutouts to realistic three dimensional designs with moving components intended to simulate live turkeys.

Of the turkey decoys that use moving components to simulate live turkeys, most are either limited in the types of movement or limited in the control of the movement, or overly complex and too expensive. For example, U.S. Pat. No. 5,274,942, to Lanius (Jan. 4, 1994), discloses a turkey decoy having a head/neck component that pivots forward and backward and is activated by a string. U.S. Pat. No. 6,092,322, to Samaras (Jul. 25, 2000), discloses a turkey decoy with a movable head. The head is attached to the body by a hook and loop assembly, with movement achieved by naturally occurring wind. U.S. Pat. No. 6,708,440, to Summers, et al. (Mar. 23, 2004), discloses a robotic turkey decoy mounted on a movable self-propelled frame and having a fannable tail assembly. U.S. Pat. No. 6,775,943, to Loughman (Aug. 17, 2004), discloses a turkey decoy with a separate (unattached) rotating tail structure operated by a pull string. U.S. Pat. No. 7,287,352, to Kirby (Oct. 30, 2007), discloses a turkey decoy with a movable anterior portion (head/neck/shoulders) and/or a movable posterior portion (tail/haunch). Movement of either portion is accomplished by a motor and a remote electronic transmitting device.

All of the foregoing designs are limited in the type of movement or the control of the movement. Decoys that depend on naturally occurring wind are useless when the wind does not blow. Decoys that are movable in just one portion do not accurately simulate a live bird. Decoys that require electronic devices to effect movement are too expensive and complicated. Decoys which do not utilize fanning simulated tails are not life-like enough.

It is therefore shown that there is a need for a life-like turkey decoy that has multiple movable components to accurately simulate a live turkey while being remotely controlled by an operator, and being inexpensive to manufacture and easy to use and maintain.

It is thus an object of the present invention to provide a life-like turkey decoy with multiple movable components.

It is a further object of the present invention to provide a life-like turkey decoy with multiple movable components that are controllable by a remote operator.

It is yet a further object of the present invention to provide a life-like turkey decoy with multiple movable components that are independently controllable by a remote operator.

It is yet a further object of the present invention to provide a life-like turkey decoy that simulates a fannable tail.

It is yet a further object of the present invention to provide a life-like turkey decoy that uses real turkey feathers in a fannable tail.

It is yet a further object of the present invention to provide a life-like turkey decoy that is inexpensive to manufacture.

It is yet a further object of the present invention to provide a life-like turkey decoy that is easy to use and maintain.

Other objects of the present invention will be readily apparent from the description that follows.

SUMMARY OF THE INVENTION

The present invention comprises a turkey decoy with separately movably head, neck, and tail assemblies, together with tail fanning capabilities, to mimic the activities of an adult turkey. The movement of the head, neck, tail, and tail fanning assemblies is accomplished by a remote operator, to minimize detection by the prey turkey while providing specific control to the movements of the decoy independently of environmental considerations, such as the lack of wind.

In one embodiment the turkey decoy comprises a full body member representation of the torso of an adult turkey, together with a securing member adapted to secure the full body member to the ground. Movably coupled to the full body member are a neck member and a tail support member, with the neck member having a head member attached and the tail support member having a tail member attached. The head member is a representation of the head of an adult turkey, and the tail member is a representation of the tail of an adult turkey. The tail member may comprise a plurality of real or artificial turkey feathers and is capable of being fanned, i.e., having the feathers movable to either a spread out orientation or a compact orientation.

The neck moving mechanism is counterweighted, keeping the neck member in a substantially upright position until movement is initiated by the operator. A cord attached to the neck moving mechanism allows the neck member to be moved downward, simulating a turkey bending its neck towards the ground. The cord may be moved by the operator pulling on it, or by an electric actuator moving it upon receipt of a communication signal. Release of the cord allows the counterweighted neck moving mechanism to return to the upright position. Optionally, the head member may be moved relative to the neck member, where a cord bends a spring connecting the head member to the neck member, simulating a turkey pecking at the ground.

The tail support moving mechanism ordinarily keeps the tail member in a substantially downward position until movement is initiated by the operator. A cord attached to the tail support moving mechanism allows the tail support member to be moved upward, simulating a turkey raising its tail to attract a mate. The cord may be moved by the operator pulling on it, or by an electric actuator moving it upon receipt of a communication signal. Release of the cord allows the tail support moving mechanism to return to the downward position. Optionally, the tail fanning member may be moved, where a cord bends a spring connected to the feathers, causing the feathers to fan, simulating a turkey's mating display.

One or more of the movements described above may be present in a given embodiment of the decoy of the present invention. Where more than one movement is present, the movements may be independently activated by the remote operator or integrated so they occur substantially simultaneously with each other.

Other features and advantages of the present invention are described below.

DESCRIPTION OF THE DRAWINGS

FIG. 4A is a side view of the neck member of another embodiment of the present invention.

FIG. 4B is a perspective view of the neck member depicted in FIG. 4A.

FIG. 4C is a front view of the neck member depicted in FIG. 4A.

FIG. 4D is a top view of the neck member depicted in FIG. 4A.

FIG. 5A is a top view of the tail support member of yet another embodiment of the present invention.

FIG. 5B is a front view of the tail support member depicted in FIG. 5A.

FIG. 5C is a side view of the tail support member depicted in FIG. 5A.

FIG. 5D is a perspective front view of the tail support mechanism depicted in FIG. 5A.

FIG. 5E is a perspective rear view of the tail support mechanism depicted in FIG. 5A.

DETAILED DESCRIPTION OF THE INVENTION

Figure 1:
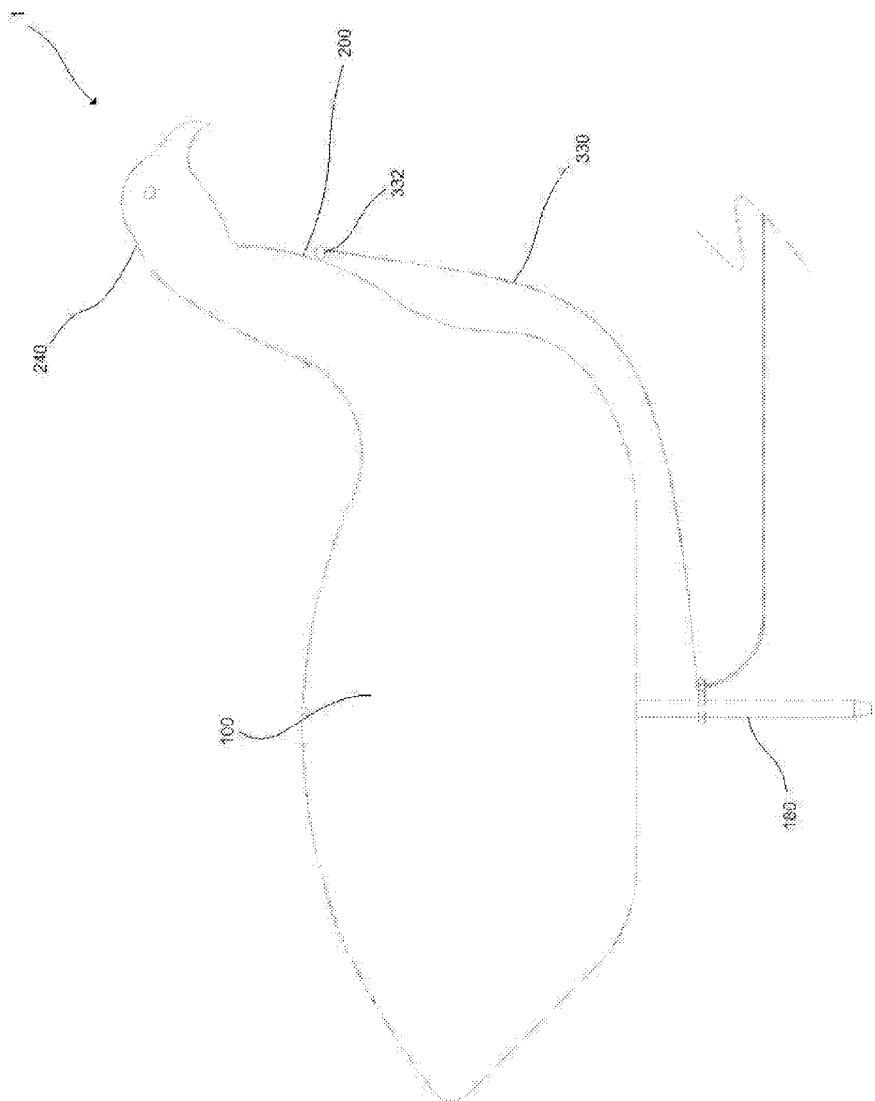
FIG. 1 is a perspective side view of one embodiment of the device of the present invention.

The present invention discloses a "full body" turkey decoy 1 having one or more of a movable head, movable neck, or movable tail. See FIG. 1. The decoy 1 is comprised of a full body member 100, a securing member 180, a neck member 200, a head member 240, and a tail member 500.

Figure 2:
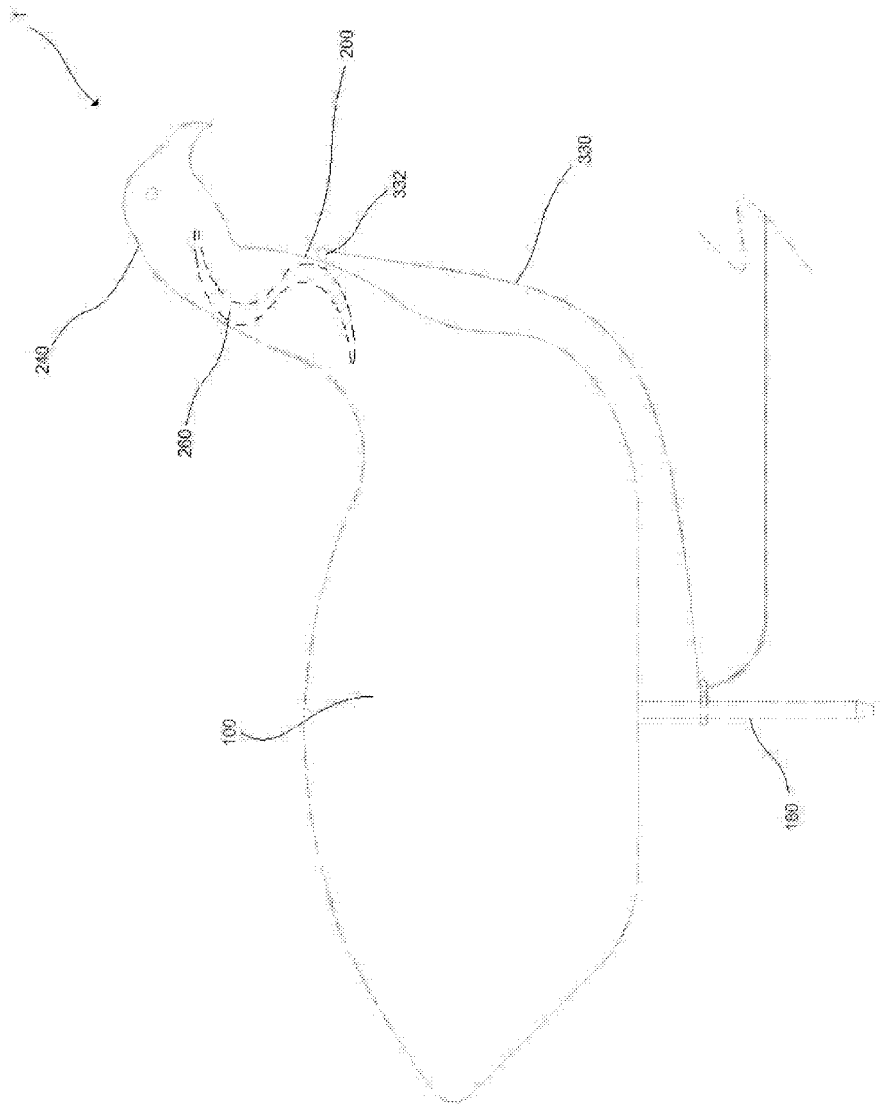
FIG. 2 is a perspective side view of the embodiment of the device depicted in FIG. 1, with ghost lines to show the interior of the decoy.

The full body member 100 is a substantially life-size representation of the torso of an adult turkey, either male or female. The full body member 100 is substantially hollow and has an interior 110. See FIG. 2. It may be made of molded plastic, vinyl, foam, or polyethylene. Its exterior may be painted with realistic coloration, and real or artificial feathers 510 may be attached to the exterior. The full body member 100 may be rigid or semi-flexible, but it must be able to hold its shape and moreover to contain internal components without distorting to any significant degree. Turkey decoys having these characteristics are well known in the art.

The securing member 180 must be substantially rigid and may be constructed of metal, wood, plastic, composite materials, and the like. It has a distal end 184 suitably adapted to be inserted into the ground. The distal end 184 of the securing member 180 may be pointed to ease insertion into the ground. The full body member 100 is attached to the proximate end 182 of the securing member 180 by an attachment component 140. The attachment component 140 may fixedly attach the full body member 100 to the securing member 180 or removably attach the full body member 100 to the securing member 180. In one embodiment the securing member 180 is a stake.

The neck member 200 is attached to the anterior portion 112 of the full body member 100. The neck member 200 may be fixedly attached to the full body member 100 or it may be removably attached to the full body member 100.

Figure 7:
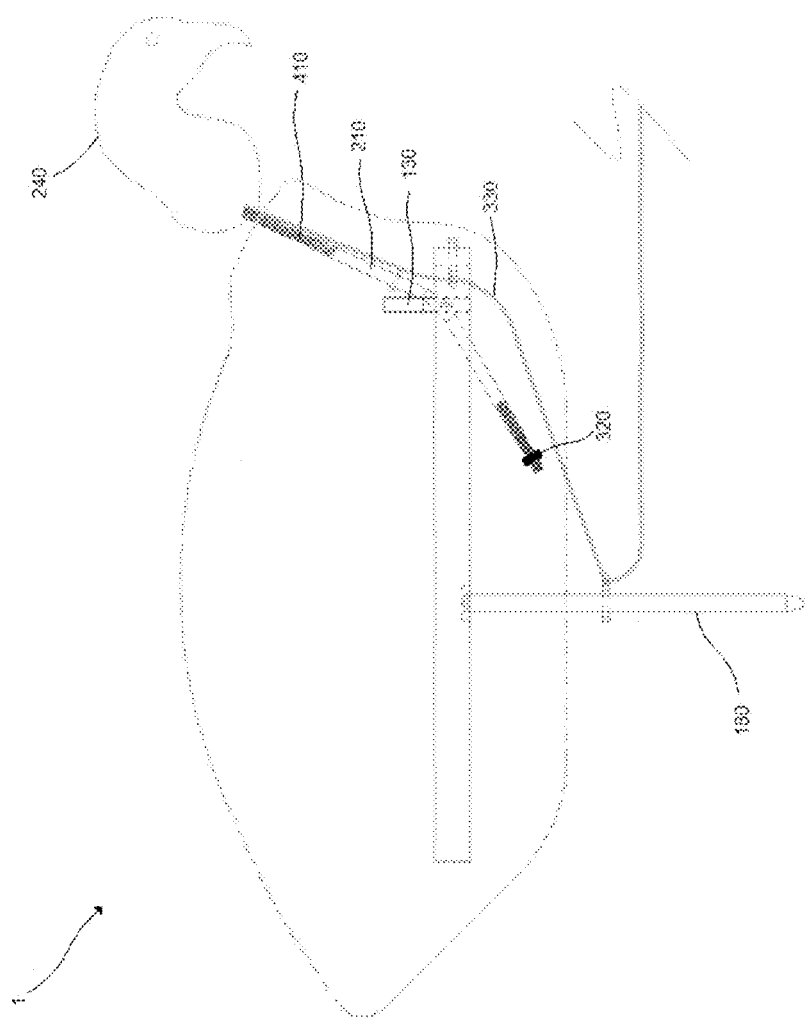
FIG. 7 is a perspective side view of yet another embodiment of the device of the present invention.

The head member 240 is attached to the neck member 200. See FIG. 7. The head member 240 may be fixedly attached to the neck member 200 or it may be movably attached to the head member 240. The head member 240 preferably is a representation of the head of an adult turkey. It may be made of molded plastic, vinyl, foam, or polyethylene. Its exterior may be painted with realistic coloration, and real or artificial feathers 510 may be attached to its exterior.

The tail member 500 is attached to the posterior portion 114 of the full body member 100. See FIG. 2. The tail member 500 may be fixedly attached to the full body member 100 or it may be removably attached to the full body member 100. The tail member 500 is a representation of the tail of an adult turkey. It comprises a plurality of feather members 510. Each of the feather members 510 is a representation of a tail feather of an adult turkey. It may be made of a synthetic material, such as plastic or vinyl, or paper, or fabric. Such feather members 510 may be colored in the pattern of a natural turkey tail feather. In one embodiment natural feathers are used for the feather members 510, preferably natural turkey tail feathers. Each feather member 510 comprises a vane 512 and a shaft 514, with the shaft 514 integrated with the vane 512. The shaft 514 has a distal portion 515 extending beyond the vane 512.

In one embodiment of the present invention, the decoy 1 further comprises a neck moving mechanism 300. See FIG. 4. The neck moving mechanism 300 is suitably adapted to move the neck member 200 in relation to the full body member 100. The neck moving mechanism 300 is further adapted to being controlled remotely by an operator.

In one variant of this embodiment, the full body member 100 comprises a neck bracket 130 and the neck member 200 comprises a neck pivot rod 210. The neck bracket 130 is located within and attached to the interior 110 of the full body member 100 within the anterior portion 112 of the full body member 100. It may be constructed of any rigid material, such as plastic, metal, wood, and the like. See FIG. 4.

The neck pivot rod 210 of this variant is substantially rigid and has a first end 212, a second end 214, and a central portion 216. It may be constructed of any rigid material, such as plastic, metal, wood, and the like. The neck pivot rod 210 should have a bend in its central portion 216, whereby the first end 212 of the neck pivot rod 210 forms an oblique angle with the second end 214 of the neck pivot rod 210. Ideally the angle should be between 110 degrees and 160 degrees. Moreover, the first end 212 of the neck pivot rod 210 is oriented forward and substantially upward, while the second end 214 of the neck pivot rod 210 is oriented rearward and substantially downward. The head member 240 is attached to the first end 212 of the neck pivot rod 210. See FIG. 7.

The neck moving mechanism 300 of this variant comprises a neck pivot pin 310, a neck counterweight 320, and a neck control cord 330. The neck pivot pin 310 is located within the central portion 216 of the neck pivot rod 210 and is suitably adapted to engage with the neck bracket 130, such that the neck pivot rod 210 is capable of movement relative to the neck bracket 130 by pivoting about the neck pivot pin 310. In one embodiment the central portion 216 of the neck pivot rod 210 comprises an aperture, said aperture passing through the thickness of the neck pivot rod 210 and being oriented substantially perpendicular to the longitudinal axis of the neck pivot rod 210. The neck pivot pin 310 is inserted into the aperture of the central portion 216 of the neck pivot rod 210 such that each end of the neck pivot pin 310 extends from the neck pivot rod 210, with each end of the neck pivot pin 310 suitably adapted to engage with the neck bracket 130. In this variant the neck bracket 130 is substantially circular and planar, and oriented substantially vertically within the full body member 100. The neck bracket 130 has a central aperture, said aperture having a greater inside diameter than the thickness of the neck pivot rod 210, so that the neck pivot rod 210 is inserted into and through the central aperture. A pair of through-apertures passing substantially through the width of the neck bracket 130 and intersecting the central aperture accommodates the ends of the neck pivot pin 310. Alternatively, the neck moving mechanism 300 comprises a pair of neck pivot pins 310, each located on opposite sides of the neck pivot rod 210.

The neck counterweight 320 in this variant is attached to the second end 214 of the neck pivot rod 210. Any size counterweight that is suitable for moving the neck pivot rod 210 when the head member 240 is attached to the first end 212 of the neck pivot rod 210 is acceptable. In one alternative the second end 214 of the neck pivot rod 210 is threaded and the neck counterweight 320 is comprised of one or more metal nuts threaded onto the second end 214 of the neck pivot rod 210.

The neck control cord 330 in this variant has a first end 332 and a second end 334, with the first end 332 of the neck control cord 330 attached to the neck pivot rod 210 at a location between the neck pivot pin 310 and the first end 212 of the neck pivot rod 210. The neck control cord 330 may be made of any suitable material, such as twine, monofilament line, wire, cabling, and the like, or a combination of same. In alternative configurations, the neck pivot rod 210 may further comprise one or more neck control cord guides 340. These neck control cord guides 340 are located on the neck pivot rod 210 at one or more locations between the neck pivot pin 310 and the first end 212 of the neck pivot rod 210, on the underside of the neck pivot rod 210. The neck control cord 330 engages with the one or more neck control cord guides 340 to facilitate movement of the neck pivot rod 210 when a force is applied to the neck control cord 330. An example of a neck control cord guide 340 is an eyelet attached to the underside of the neck pivot rod 210. The neck control cord 330 passes through the eyelet, with the eyelet keeping the neck control cord 330 along the neck pivot rod 210 from the first end 332 of the neck control cord 330 to the eyelet.

In this variant, the operator controls the movement of the neck member 200 by applying or releasing a force, respectively, to the neck control cord 330. The application of a force on the neck control cord 330 is suitably adapted to move the first end 212 of the neck pivot rod 210 in a substantially downward direction, simultaneously moving the second end 214 of the neck pivot rod 210 in a substantially upward direction. The release of a force from the neck control cord 330 allows the neck counterweight 320 to move the second end 214 of the neck pivot rod 210 in a substantially downward direction, simultaneously moving the first end 212 of the neck pivot rod 210 in a substantially upward direction. The applying or releasing of the force may be accomplished by the operator manually pulling on the neck control cord 330. In such case the neck control cord 330 may be of considerable length, preferably of several dozen yards, to allow the operator to control the movement of the neck member 200 remotely and out of detection of intended prey turkeys. The applying or releasing of the force may alternatively be accomplished electronically. In such case the neck control cord 330 is relatively short and is attached to a small electronic actuator which is activated by a remote electronic signaling device. The operator transmits an electronic signal to the actuator which then applies a force to the neck control cord 330 or releases said force, as the case may be. Such electronic actuators and signaling devices are well known in the art, and may include infra red devices, radio frequency identification devices, radio transmitters, and the like.

In a variant of this embodiment of the present invention, the neck pivot rod 210 is configured as described above. The neck moving mechanism 300 of this variant comprises a neck pivot pin 310 and a neck control cord 330. The neck pivot pin 310 is located at the second end 214 of the neck pivot rod 210 and is suitably adapted to engage with the neck bracket 130, such that the neck pivot rod 210 is capable of movement relative to the neck bracket 130 by pivoting about the neck pivot pin 310. Alternatively, the neck moving mechanism 300 comprises a pair of neck pivot pins 310, each located on opposite sides of the neck pivot rod 210. In one embodiment the second end 214 of the neck pivot rod 210 comprises an aperture, as described above, to accommodate the one or more neck pivot pins 310.

There is no independent neck counterweight 320 in this variant; rather, the head member 240 acts as a counterweight. The neck control cord 330 in this variant is configured as described above. It is attached to the neck pivot rod 210 at a location between the neck pivot pin 310 and the first end 212 of the neck pivot rod 210. In this variant, the operator controls the movement of the neck member 200 by applying or releasing a force, respectively, to the neck control cord 330. The application of a force on the neck control cord 330 is suitably adapted to move the first end 212 of the neck pivot rod 210 in a substantially upward direction. The release of a force from the neck control cord 330 is suitably adapted to cause the weight of the head member 240 to move the first end 212 of the neck pivot rod 210 in a substantially downward direction. The applying or releasing of the force may be accomplished by the operator manually pulling on the neck control cord 330, or by electronic means, as described above. In alternative configurations, the neck pivot rod 210 may further comprise one or more neck control cord guides 340, as described above.

In another embodiment of the present invention, the decoy 1 further comprises a head moving mechanism 400. The head moving mechanism 400 is suitably adapted to move the head member 240 in relation to the neck member 200, wherein the head member 240 is movably attached to the neck member 200. The head moving mechanism 400 is further adapted to being controlled remotely by an operator.

In one variant of this embodiment, the head moving mechanism 400 comprises a head spring 410 and a head control cord 430. See FIG. 4. The head spring 410 has a first end 412 and a second end 414. The head member 240 is attached to the first end 412 of the head spring 410, and the head spring 410 is attached at its second end 414 to the neck member 200. The head spring 410 can be any type of spring suitable for its purpose, which is to be capable of remaining suitably in an unbent orientation with the head member 240 attached, but also capable of being bent when a force is applied to its first end 412. In the preferred embodiment the head spring 410 is made of metal.

The head control cord 430 in this variant has a first end and a second end, with the first end of the head control cord 430 attached to the first end 412 of the head spring 410 or to the head member 240. The head control cord 430 may be made of any suitable material, such as twine, monofilament line, wire, cabling, and the like, or a combination of same.

In this variant the operator controls the movement of the head moving mechanism 400 by applying or releasing a force, respectively, to the head control cord 430. The application of a force on the head control cord 430 is suitably adapted to cause a bending of the head spring 410 in a substantially downward direction. The release of a force from the head control cord 430 is suitably adapted to allow for the unbending of the head spring 410, returning the head spring 410 to a substantially straightened orientation. The applying or releasing of the force may be accomplished by the operator manually pulling on the head control cord 430. In such case the head control cord 430 may be of considerable length, preferably of several dozen yards, to allow the operator to control the movement of the head member 240 remotely and out of detection of intended prey turkeys. The applying or releasing of the force may alternatively be accomplished electronically. In such case the head control cord 430 is relatively short and is attached to a small electronic actuator which is activated by a remote electronic signaling device. The operator sends an electronic signal to the actuator which then applies a force to the head control cord 430 or releases said force, as the case may be.

In yet another embodiment of the present invention, the decoy 1 further comprises a head moving mechanism 400 integrated with the neck moving mechanism 300. In one variant of this embodiment, the neck moving mechanism 300 is configured as described above, comprising one or more neck pivot pins 310, a neck counterweight 320, and a neck control cord 330, as described above, with the full body member 100 comprising a neck bracket 130, as described above, and the neck member 200 comprising a neck pivot rod 210, as described above. The head moving mechanism 400 comprises a head spring 410, as described above, but also utilizes the neck control cord 330 rather than a separate head control cord 430. In this variant the first end 332 of the neck control cord 330 is attached to the first end 412 of the head spring 410.

In this variant the operator controls the movement of the head moving mechanism 400 by applying or releasing a force, respectively, to the neck control cord 330. The application of a force on the neck control cord 330 is suitably adapted to cause a bending of the head spring 410 in a substantially downward direction and the movement of the first end 212 of the neck pivot rod 210 in a substantially downward direction and the movement of the second end 214 of the neck pivot rod 210 in a substantially upward direction. The release of a force from the neck control cord 330 allows for the unbending of the head spring 410, returning the head spring 410 to a substantially straightened orientation, and causes the neck counterweight 320 to move the second end 214 of the neck pivot rod 210 in a substantially downward direction while simultaneously moving the first end 212 of the neck pivot rod 210 in a substantially upward direction. As described above, the applying or releasing of the force may be accomplished by the operator manually pulling on the neck control cord 330, or by electronic means.

In yet another embodiment of the present invention, the neck member 200 is integrated with the full body member 100, is substantially flexible, and is capable of being moved into a flexed orientation. The flexibility of the neck member 200 causes it to have a bias toward being in a straightened orientation. In this embodiment the neck moving mechanism 300 comprises a neck control cord 330, with the first end 332 of the neck control cord 330 being attached to the neck member 200. The operator controls the movement of the neck member 200 by applying or releasing a force, respectively, to the neck control cord 330, whereby the application of a force on the neck control cord 330 causes a flexing of the neck member 200 in a substantially downward direction, and the release of a force from the neck control cord 330 causes the unflexing of the neck member 200, returning it to a substantially straightened orientation.

In yet another embodiment of the present invention, the decoy 1 comprises a tail support member 600 and a tail support moving mechanism 700. See FIG. 5. The tail support member 600 is movably attached to the posterior portion 114 of the full body member 100, and is suitably adapted to support the tail member 500 and to attach the tail member 500 to the full body member 100. The tail support moving mechanism 700 is suitably adapted to move the tail support member 600 in relation to the full body member 100, and is further adapted to being controlled remotely by an operator.

In one variant of this embodiment, the full body member 100 comprises a tail bracket 160 and the tail support member 600 comprises a tail pivot rod 610 and a support body 620. The tail bracket 160 is located within and attached to the interior 110 of the full body member 100 within the posterior portion 114 of the full body member 100. It may be constructed of any rigid material, such as plastic, metal, wood, and the like.

The tail pivot rod 610 of this variant is substantially rigid and has a first end 612, a second end, and a central portion 616. It may be constructed of any rigid material, such as plastic, metal, wood, and the like. The tail pivot rod 610 should be substantially straight.

The support body 620 of this variant is attached to the first end 612 of the tail pivot rod 610. The support body 620 is adapted to contain the tail member 500. The support body 620 has a first planar member 622 and a second planar member 624, with the two planar members 622,624 being oriented substantially parallel to each other and spaced apart from each other. The planar members 622,624 are held together by a base member 626. The planar members 622,624 and the base member 626 may be made of any rigid material, such as plastic, metal, wood, and the like. The planar members 622,624 may be of any suitable shape, but preferably are each semi-circular and of substantially the same size as the other. The tail member 500 is located between the planar members 622,624, with the feather members 510 of the tail member 500 at least partially extending outward from between the planar members 622, 624.

The tail support moving mechanism 700 of this variant comprises a tail pivot pin 710 and a tail control cord 730. A tail counterweight 720 may also be used to facilitate movement of the tail support member 600. The tail pivot pin 710 is located within the central portion 616 of the tail pivot rod 610 and is suitably adapted to engage with the tail bracket 160, such that the tail pivot rod 610 is capable of movement relative to the tail bracket 160 by pivoting about the tail pivot pin 710. In an alternative embodiment the tail pivot pin 710 is located within the second end of the tail pivot rod 610.

In one embodiment the tail pivot rod 610 comprises an aperture, said aperture passing through the thickness of the tail pivot rod 610 and being oriented substantially perpendicular to the longitudinal axis of the tail pivot rod 610. The tail pivot pin 710 is inserted into the aperture of the tail pivot rod 610 such that each end of the tail pivot pin 710 extends from the tail pivot rod 610, with each end of the tail pivot pin 710 suitably adapted to engage with the tail bracket 160. In one variant the tail bracket 160 is substantially "U" shaped and planar, and oriented substantially horizontally within the full body member 100. The arms of the "U" of the tail bracket 160 are spaced apart sufficiently to accommodate the thickness of the tail pivot rod 610, so that the tail pivot rod 610 is located between said arms. A pair of apertures, one located in each arm, accommodates the ends of the tail pivot pin 710. The tail pivot pin 710 may be connected to the tail bracket 160 by other means, such as by flanges attached to the tail bracket 160. Alternatively, the tail support moving mechanism 700 comprises a pair of tail pivot pins 710, each located on opposite sides of the tail pivot rod 610.

Where the one or more tail pivot pins 710 are located with the central portion 616 of the tail pivot rod 610, a tail counterweight 720 may be attached to the second end of the tail pivot rod 610 to assist with the movement of the tail support member 600. Any size counterweight that is suitable for moving the tail pivot rod 610 when the tail support member 600 is attached to the first end 612 of the tail pivot rod 610 is acceptable. In one alternative the tail counterweight 720 is a solid mass affixed to the second end of the tail pivot rod 610. In another alternative the second end of the tail pivot rod 610 is threaded and the tail counterweight 720 is comprised of one or more metal nuts threaded onto the second end of the tail pivot rod 610.

The tail control cord 730 in this variant has a first end 732 and a second end 734, with the first end 732 of the tail control cord 730 attached to the tail pivot rod 610 at a location between the one or more tail pivot pins 710 and the first end 612 of the tail pivot rod 610. The tail control cord 730 may be made of any suitable material, such as twine, monofilament line, wire, cabling, and the like, or a combination of same. In alternative configurations, the tail pivot rod 610 may further comprise one or more tail control cord guides 740. These tail control cord guides 740 are located on the tail pivot rod 610 at one or more locations. The tail control cord 730 engages with the one or more tail control cord guides 740 to facilitate movement of the tail pivot rod 610 when a force is applied to the tail control cord 730. An example of a tail control cord guide 740 is an aperture formed through the tail pivot rod 610. The tail control cord 730 passes through the aperture, with the aperture keeping the tail control cord 730 along the tail pivot rod 610 from the first end 732 of the tail control cord 730 to the aperture. An alternate example of a tail control cord guide 740 is an L-shaped channel, with one end of the channel having an opening at the first end 612 of the tail pivot rod 610 and the other end of the channel having an opening through the side of the tail pivot rod 610. The tail control cord 730 passes through the channel, thereby being redirected ninety degrees. This configuration facilitates integration of the tail fanning moving mechanism 900 with the tail support moving mechanism 700.

In this variant, the operator controls the movement of the tail support member 600 by applying or releasing a force, respectively, to the tail control cord 730. The application of a force on the tail control cord 730 is suitably adapted to move the first end 612 of the tail pivot rod 610 in a substantially upward direction. The release of a force from the tail control cord 730 is suitably adapted to allow the first end 612 of the tail pivot rod 610 to move in a substantially downward direction. The applying or releasing of the force may be accomplished by the operator manually pulling on the tail control cord 730. In such case the tail control cord 730 may be of considerable length, preferably of several dozen yards, to allow the operator to control the movement of the tail support member 600 remotely and out of detection of intended prey turkeys. The applying or releasing of the force may alternatively be accomplished electronically. In such case the tail control cord 730 is relatively short and is attached to a small electronic actuator which is activated by a remote electronic signaling device, as described above with regard to the neck moving mechanism 300. Alternatively, the tail counterweight 720 may be configured to create movement of the tail pivot rod 610 in the opposite direction. That is, the application of a force on the tail control cord 730 moves the first end 612 of the tail pivot rod 610 in a substantially downward direction while simultaneously moving the second end of the tail pivot rod 610 in a substantially upward direction. The release of a force from the tail control cord 730 causes the tail counterweight 720 to move the second end of the tail pivot rod 610 in a substantially downward direction while simultaneously moving the first end 612 of the tail pivot rod 610 in a substantially upward direction.

Figure 6B:
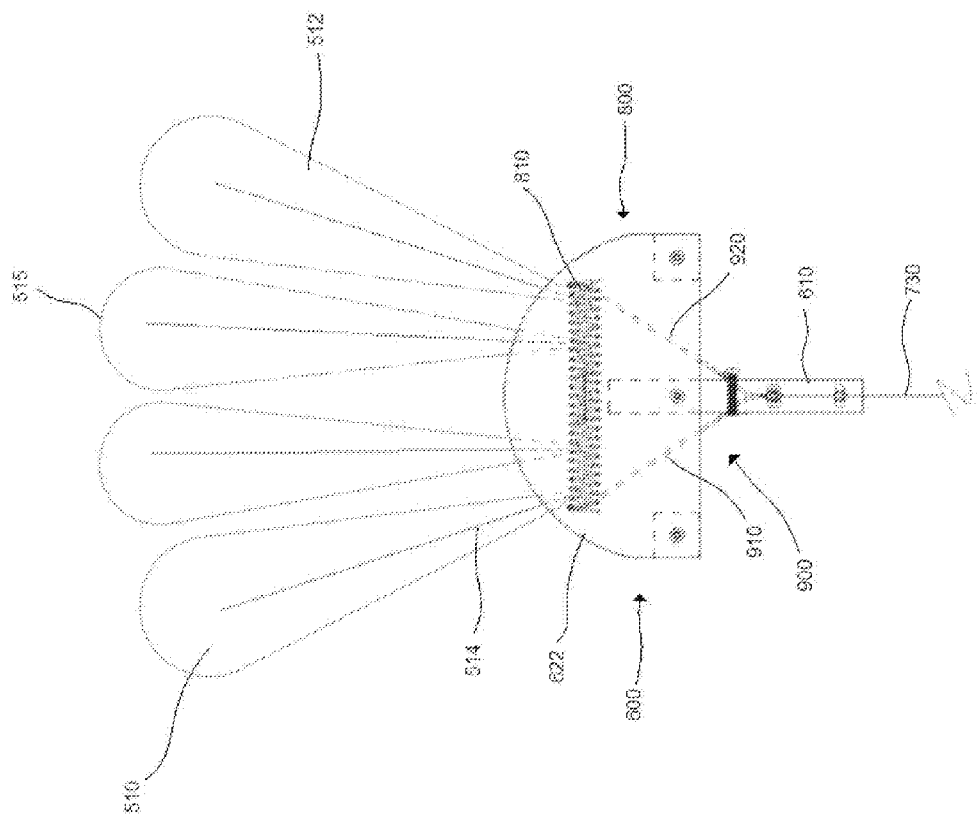
FIG. 6B is a front view of the tail support mechanism depicted in FIG. 5A.
Figure 6A:
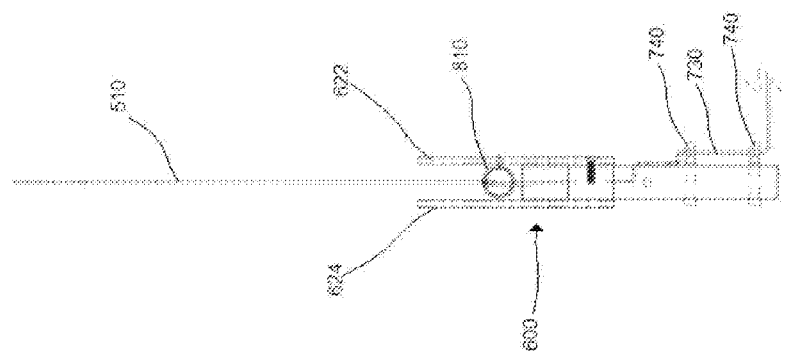
FIG. 6A is a side view of the tail support mechanism depicted in FIG. 5A.

In another embodiment of the present invention, the decoy 1 further comprises a tail fanning mechanism 800 and a tail fanning moving mechanism 900. See FIG. 6. The tail fanning mechanism 800 is suitably adapted to move the individual feather members 510 of the tail member 500 in relation to each other such that the feather members 510 may be positioned in a fanned state and an unfanned state. The tail fanning mechanism 800 is attached to the tail support member 600. The tail fanning moving mechanism 900 is suitably adapted to cause the tail fanning mechanism 800 to move the feather members 510 to a fanned state and to an unfanned state. The tail fanning moving mechanism 900 is further adapted to being controlled remotely by an operator.

In one variant of this embodiment, the tail fanning mechanism 800 comprises a tail spring 810. The tail spring 810 is comprised of a plurality of coils 818 and has a first end 812, a second end 814, and a central portion 816 located between the first and second ends 812,814. The tail spring 810 is attached at its central portion 816 to the tail support member 600 and positioned in a substantially horizontal orientation. The tail spring 810 can be any type of spring suitable for its purpose, which is to be capable of remaining suitably in an unbent orientation in the absence of external forces but also capable of being bent at both ends when a force is applied to its ends. In the preferred embodiment the tail spring 810 is made of metal.

In this variant each of the feather members 510 of the tail member 500 is attached to one of the plurality of coils 818 of the tail spring 810, one feather member 510 per coil 818, with each feather member 510 extending in a substantially upward orientation relative to the tail spring 810. In the preferred embodiment the distal portion 515 of the shaft 514 of each feather member 510 is attached to a coil 818.

In this variant the tail fanning moving mechanism 900 comprises a first cord 910, a second cord 920, and a tail control cord 730. The first cord 910 has a first end 912 and a second end 914 and is attached to the first end 812 of the tail spring 810 by its first end 912. The second cord 920 has a first end 922 and a second end 924 and is attached to the second end 814 of the tail spring 810 by its first end 922.

Movement of the first cord 910 applies a force to the first end 812 of the tail spring 810, bending the first end 812 of the tail spring 810 in a substantially downward direction, and movement of the second cord 920 applies a force to the second end 814 of the tail spring 810, bending the second end 814 of the tail spring 810 in a substantially downward direction. The tail control cord 730 has a first end 732 and a second end 734, with the first end 732 of the tail control cord 730 attached to the second ends 914,924 of the first and second cords 910,920. The first cord 910, the second cord 920, and the tail control cord 730 may be made of any suitable material, such as twine, monofilament line, wire, cabling, and the like, or a combination of same.

In this variant, the operator controls the fanning and unfanning of the feather members 510 of the tail member 500 by applying or releasing a force, respectively, to the tail control cord 730. The application of a force on the tail control cord 730 is suitably adapted to simultaneously move the first and second cords 910,920, causing the substantially simultaneous bending of the first and second ends 812,814 of the tail spring 810 in a substantially downward direction, thereby moving the feather members 510 attached to the tail spring 810 to a fanned state. The release of the force from the tail control cord 730 is suitably adapted to cause the substantially simultaneous unbending of the first and second ends 812,814 of the tail spring 810, returning the tail spring 810 to a substantially unbent orientation, thereby moving the feather members 510 to an unfanned state. The applying or releasing of the force may be accomplished by the operator manually pulling on the tail control cord 730. In such case the tail control cord 730 may be of considerable length, preferably of several dozen yards, to allow the operator to control the movement of the tail support member 600 remotely and out of detection of intended prey turkeys. The applying or releasing of the force may alternatively be accomplished electronically. In such case the tail control cord 730 is relatively short and is attached to a small electronic actuator which is activated by a remote electronic signaling device, as described above with regard to the tail support moving mechanism 700.

In yet another embodiment of the present invention, the decoy 1 further comprises a tail fanning mechanism 800 and a tail fanning moving mechanism 900 integrated with the tail support moving mechanism 700. In one variant of this embodiment, the tail support moving mechanism 700 is configured as described above, comprising one or more tail pivot pins 710 and a tail control cord 730, as described above, with the full body member 100 comprising a tail bracket 160, as described above, and the tail support member 600 comprising a tail pivot rod 610, as described above. The tail fanning mechanism 800 comprises a tail spring 810, as described above. The tail fanning moving mechanism 900 comprises a first and second cord 910,920, as described above, but utilizes the same tail control cord 730 as is used by the tail support moving mechanism 700, rather than a separate tail control cord 730. In this variant the first end 732 of the tail control cord 730 is attached to the second ends 914,924 of the first and second cords 910,920 of the tail fanning moving mechanism 900.

In this variant the operator controls the movement of the tail support moving mechanism 700 by applying or releasing a force, respectively, to the tail control cord 730. The application of a force on the tail control cord 730 is suitably adapted to cause the movement of the first end 612 of the tail pivot rod 610 in a substantially upward direction, while simultaneously causing a bending of the ends of the tail spring 810 in a substantially downward direction, moving the feather members 510 to a fanned state. The release of a force from the tail control cord 730 is suitably adapted to allow the first end 612 of the tail pivot rod 610 to move in a substantially downward direction while simultaneously causing the unbending of the tail spring 810, moving the feather members 510 to an unfanned state. As described above, the applying or releasing of the force may be accomplished by the operator manually pulling on the tail control cord 730, or by electronic means.

In yet another embodiment of the present invention, the decoy 1 comprises the neck moving mechanism 300, the head moving mechanism 400, the tail support moving mechanism 700, the tail fanning mechanism 800, and the tail fanning moving mechanism 900, as described above. The neck moving mechanism 300 and the head moving mechanism 400 may be separately controlled or integrated with a single control. Similarly, the tail support moving mechanism 700 and the tail fanning moving mechanism 900 may be separately controlled or integrated with a single control. Each of these mechanisms may be configured as described above. As further described above, the applying or releasing of forces on the control means of the various mechanisms may be accomplished by an operator manually pulling on the various control cords, or by electronic means.

Figure 3:
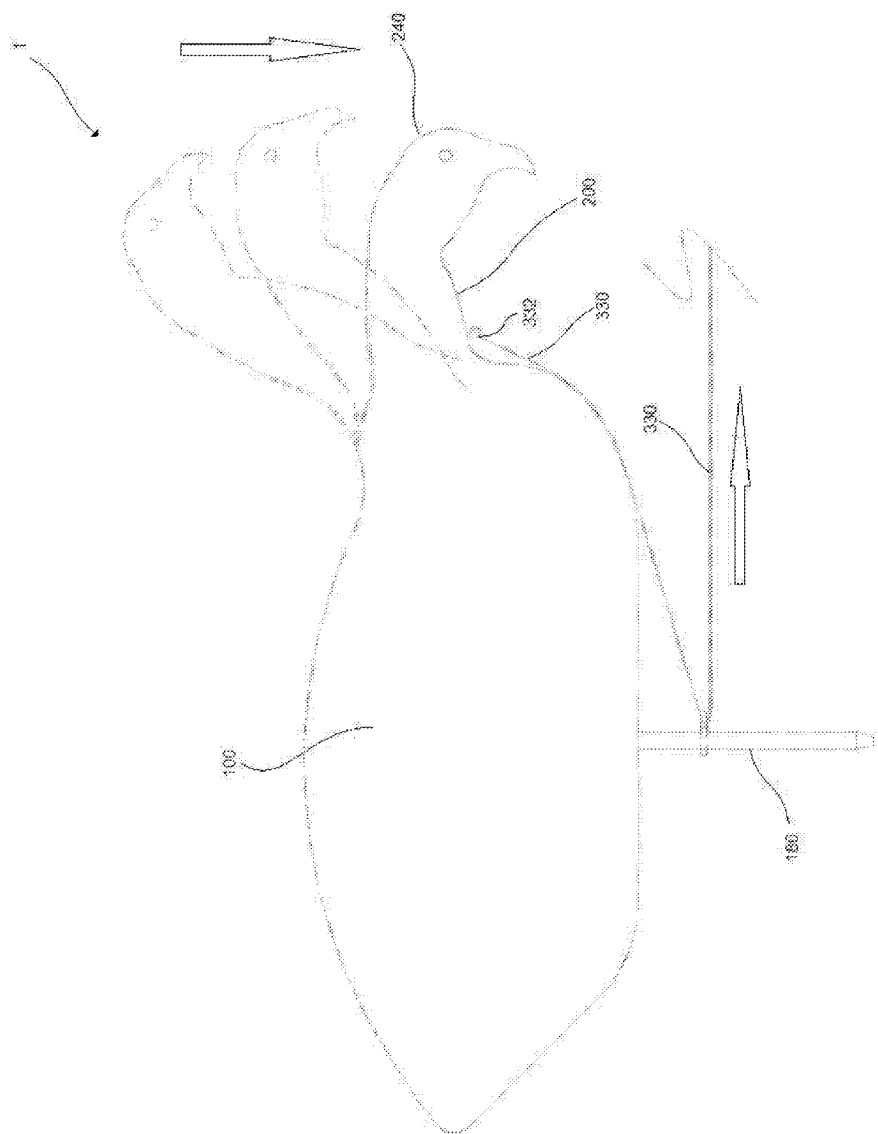
FIG. 3 is a perspective side view of the embodiment of the device depicted in FIG. 1, with ghost lines to show movement of the decoy.

In yet another embodiment of the present invention, the decoy 1 comprises the neck moving mechanism 300, the tail support moving mechanism 700, the tail fanning mechanism 800, and the tail fanning moving mechanism 900, as described above. The neck moving mechanism 300, the tail support moving mechanism 700, and the tail fanning moving mechanism 900 are integrated with a single control. See FIG. 3. Each of these mechanisms may be configured as described above, with the neck moving mechanism 300 being the variant whereby no neck counterweight 320 is used and the application of a force to the neck control cord 330 moves the first end 212 of the neck pivot rod 210 in a substantially upward direction. In this embodiment the second end 334 of the neck control cord 330 is attached to the tail control cord 730; the applying or releasing of forces on the tail control cord 730 thus simultaneously operates the neck control cord 330. In an alternative to this embodiment, the second end 734 of the tail control cord 730 is attached to the neck control cord 330; the applying or releasing of forces on the neck control cord 330 thus simultaneously operates the tail control cord 730. As further described above, the applying or releasing of forces on the control means of the various mechanisms may be accomplished by an operator manually pulling on the tail control cord 730 or the neck control cord 330, as applicable, or by electronic means.

In yet another embodiment of the present invention, the decoy 1 comprises the tail support moving mechanism 700, as described above and the full body member 100 comprises a back member 1000. The back member 1000 is located on the upper side of the full body member 100 between the anterior portion 112 and the posterior portion 114 of the full body member 100. The back member 1000 is movable in relation to the remainder of the full body member 100, adding to the realism of the decoy 1. The back member 1000 comprises a plurality of ribs 1010, each rib being substantially "U" shaped. The ends of each rib 1010 are pivotally attached to the full body member 100 on either side of the full body member 100, such that each rib 1010 laterally spans the full body member 100. The back member 1000 further comprises a lifting rod 1020. The lifting rod 1020 is elongate and substantially flexible. It is located under the plurality of ribs 1010, substantially along the longitudinal axis of the decoy 1. The first end of the lifting rod 1020 is attached to the anterior portion 112 of the full body member 100 and the second end of the lifting rod 1020 is attached to the tail support member 600. The lifting rod 1020 is bowed slightly upwards when the tail support member 600 is oriented substantially downward. The back member 1000 further comprises a back member cover 1030. The back member cover 1030 is attached to the plurality of ribs 1010. The back member 1000, then, is seen to be formed of three layers: the back member cover 1030, being the top layer, the lifting rod 1020, being the lowest layer, and the plurality of ribs 1010 being the intermediate layer. The plurality of ribs 1010 are further oriented such that the bend of each rib 1010 extends rearward. In this embodiment, movement of the tail support member 600 causes the lifting and falling of the back member 1000. That is, movement of the tail support member 600 in a substantially upward direction causes the lifting rod 1020 to flex upward. As the lifting rod 1020 flexes upward it presses against the plurality of ribs 1010, causing them to pivot in a substantially upward direction. The pivoting of the ribs 1010 in an upward direction causing the back member cover 1030 to be moved in a substantially upward direction. Movement of the tail support member 600 in a substantially downward direction causes the lifting rod 1020 to straighten. The weight of the back member cover 1030 then presses the ribs 1010 in a substantially downward direction, allowing the back member cover 1030 to move in a substantially downward direction. In one embodiment the back cover member 1030 is comprised of a plurality of feather members. Thus, the raising and lowering of the back member cover 1030 simulates the ruffing of feathers on a live turkey.

What has been described and illustrated herein is a preferred embodiment of the turkey decoy 1 of the present invention, along with some it its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Other embodiments not specifically set forth herein are therefore also within the scope of the following claims.

I claim:

1. A turkey decoy comprising
a full body member, said full body member being a representation of the torso of an adult turkey, said full body member being substantially hollow and having an interior, an anterior portion, and a posterior portion;
a securing member, said securing member being substantially rigid and having a proximate end and a distal end, with the proximate end of the securing member being attached to the full body member and the distal end of the securing member suitably adapted to being inserted into the ground, such that the full body member is secured to the ground by the securing member;
a neck member, said neck member being integrated in a non-articulated manner, with the anterior portion of the full body member, with said neck member being substantially flexible and capable of being moved into a flexed orientation, having a bias toward being in a straightened orientation;
a head member, said head member being attached to the neck member in a non-articulated manner and being configured to move in relation to said neck member; and
a neck moving mechanism, said neck moving mechanism suitably adapted to move the neck member in relation to the full body member, said neck moving mechanism further adapted to being controlled remotely by an operator, wherein said head member, said neck member, and said anterior portion are formed as a hollow, one piece arrangement.

2. The turkey decoy of claim 1 wherein
the neck moving mechanism comprises a neck control cord having a first end and a second end, with the first end of the neck control cord being attached to the neck member;
whereby the operator controls the movement of the neck moving mechanism by applying or releasing a force, respectively, to the neck control cord,
with the application of a force on the neck control cord suitably adapted to cause a flexing of the neck member in a substantially downward direction, and
with the release of a force from the neck control cord suitably adapted to cause the unflexing of the neck member, returning the neck member to a substantially straightened orientation.

3. A turkey decoy comprising
a full body member, said full body member being a representation of the torso of an adult turkey, said full body member being substantially hollow and having an interior, an anterior portion, and a posterior portion;
a securing member, said securing member being substantially rigid and having a proximate end and a distal end, with the proximate end of the securing member being attached to the full body member and the distal end of the securing member suitably adapted to being inserted into the ground, such that the full body member is secured to the ground by the securing member;
a neck member, said neck member being integrated in a non-articulated manner, with the anterior portion of the full body member, with said neck member being substantially flexible and capable of being moved into a flexed orientation, having a bias toward being in a straightened orientation;
a head member, said head member being attached to the neck member in a non-articulated manner and being configured to move in relation to said neck member, wherein said head member, said neck member, and said anterior portion are formed as a hollow, one piece arrangement; and
a neck control cord having a first end and a second end, with the first end of the neck control cord attached to the neck member;
wherein the operator controls movement of the neck member by applying or releasing a force, respectively, to the neck control cord,
with the application of a force on the neck control cord suitably adapted to cause a flexing of the neck member to move the neck member in a substantially downward direction, and
with the release of a force from the neck control cord suitably adapted to cause the unflexing of the neck member, allowing the neck member to move in a substantially upward direction, thereby returning the neck member to a substantially straightened orientation.

4. The turkey decoy of claim 3 wherein the application or releasing of the force, respectively, to the neck control cord is accomplished through the use of an electronic device which is remotely activated by the operator.

5. The turkey decoy of claim 3 wherein a biasing member moves the neck member in a substantially upward direction upon the release of the force from the neck control cord.

6. The turkey decoy of claim 2 wherein a biasing member moves the neck member in a substantially upward direction upon the release of the force from the neck control cord.

7. The turkey decoy of claim 2 wherein the application or releasing of the force, respectively, to the neck control cord is accomplished through the use of an electronic device which is remotely activated by the operator.

\* \* \* \* \*